July 19, 1955  E. L. SHAW ET AL  2,713,312
PRESSURE COMPENSATOR

Filed June 10, 1952  5 Sheets-Sheet 1

INVENTORS
EDWIN L. SHAW
BY CECIL E. ADAMS

Herschel C. Omohundro
attorney

INVENTORS
EDWIN L. SHAW
BY CECIL E. ADAMS

July 19, 1955  E. L. SHAW ET AL  2,713,312
PRESSURE COMPENSATOR
Filed June 10, 1952  5 Sheets-Sheet 3

INVENTORS
EDWIN L. SHAW
BY CECIL E. ADAMS
Herschel E. Omohundro
attorney

United States Patent Office 2,713,312
Patented July 19, 1955

2,713,312

PRESSURE COMPENSATOR

Edwin L. Shaw and Cecil E. Adams, Columbus, Ohio, assignors to The Denison Engineering Company, Columbus, Ohio Application June 10, 1952, Serial No. 292,752

7 Claims. (Cl. 103—162)

This invention relates generally to hydraulics and is more particularly directed to control apparatus of the type used in connection with fluid pressure energy translating devices, particularly those employed as pumps. The control apparatus forming the subject matter of this invention is commonly referred to in the art as a pressure compensator.

An object of this invention is to provide a pressure compensator similar in character to conventional compensators but modified by the provision of a flow control mechanism between the source of pressure used to effect the operation of the compensator and a motor of the piston and cylinder type which operates the compensator. The purpose of the flow control mechanism is to stabilize the operation of the device and secure more uniform results.

Another object of the invention is to provide a fluid pressure compensating device for a hydraulic pump, such device having a flow control mechanism incorporated in the end portion of the cylinder of the fluid motor used to actuate the volume varying member of a pump, a flow control being of such character that it will function as part of the motor during a portion of the operation and then as a flow control mechanism during the remainder of the operation.

Another object of the invention is to provide a pressure compensator having a piston and cylinder motor with a supplemental or flow control piston arranged in the cylinder, the flow control piston having a restricted orifice therethrough, the cylinder being connected with a source of pressure, preferably the outlet of the pump, and a pressure responsive valve being disposed in such connection to regulate the flow of fluid from the pressure source to the cylinder to effect the operation of the piston.

A further object of the invention is to employ a valve in the passage establishing communication between the source of pressure and the actuating piston and cylinder of the compensator, such valve being of the type exposed to pressures which will render the valve more sensitive to the actuating pressure thus making the control more effective.

Further objects and advantages of the present invention will be apparent from the following description, reference being had to the accompanying drawings wherein a preferred form of embodiment of the invention is clearly shown.

Figure 2:
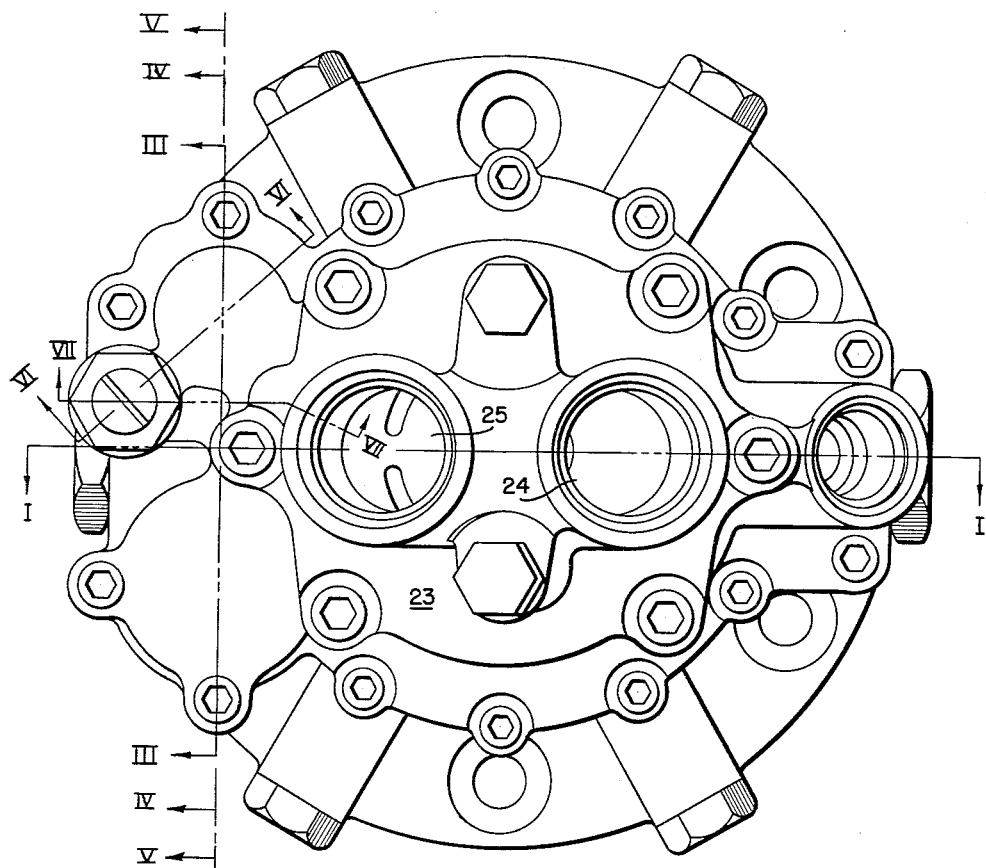
Fig. 2 is an end elevational view of the device shown in Fig. 1.
Figure 3:
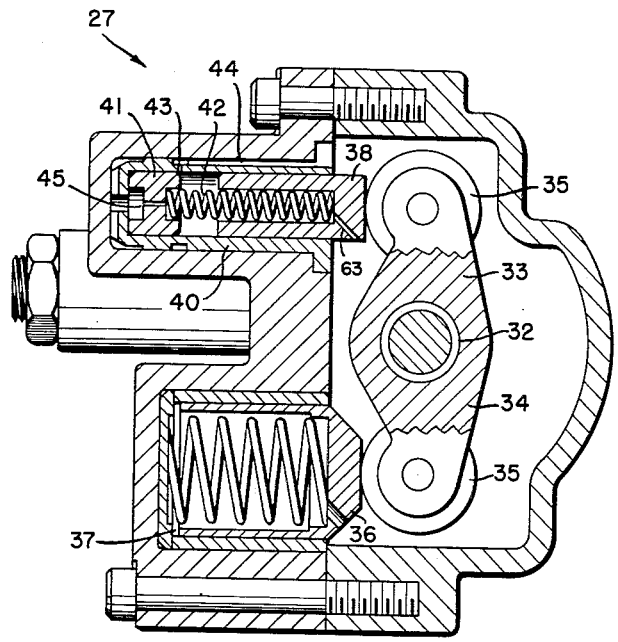
Figure 4:
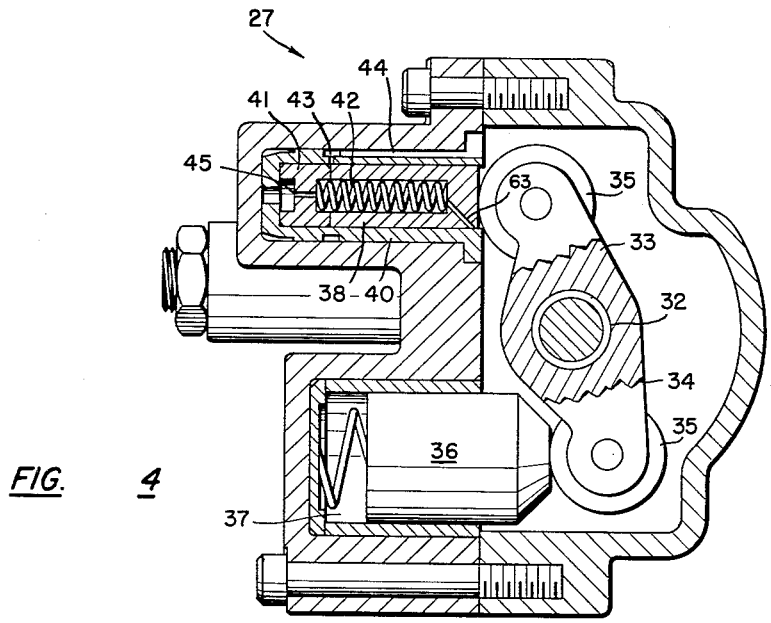
Figure 5:
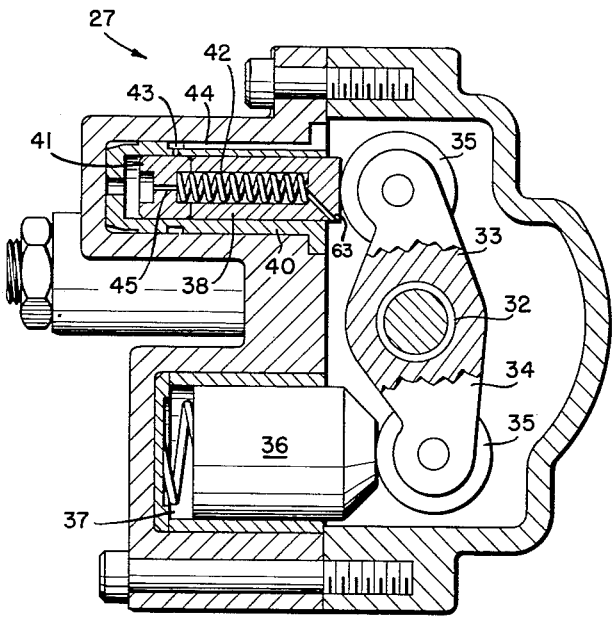

Figs. 3, 4, and 5 are detail vertical sectional views taken on the plane indicated by the line III—III, IV—IV and V—V, respectively, of Fig. 2 and showing the parts of the pressure compensator in different positions of operation.

Figure 6:
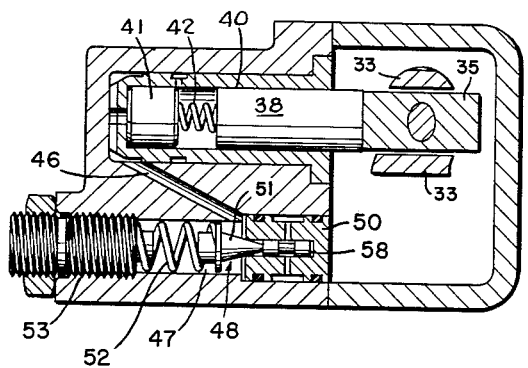

Fig. 6 is a detail sectional view taken through the device on the plane indicated by the line VI—VI.

Figure 7:
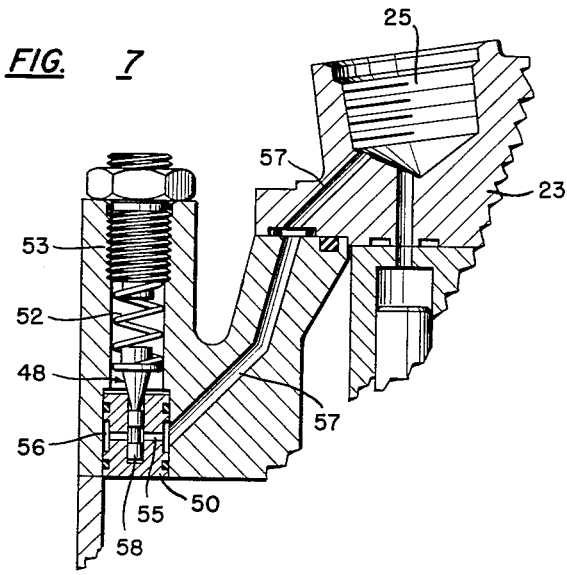

Fig. 7 is a similar view taken on angularly related planes indicated by the line VII—VII of Fig. 2.

Figure 8:
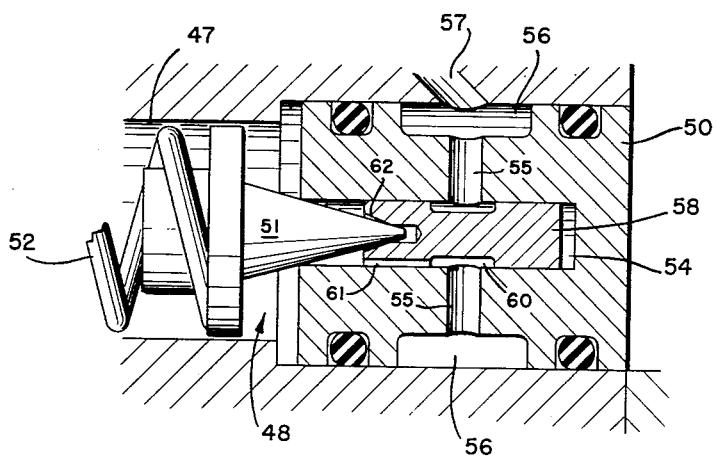

Fig. 8 is a longitudinal sectional view on an enlarged scale taken through the pressure responsive valve shown in Fig. 6.

Figure 1:
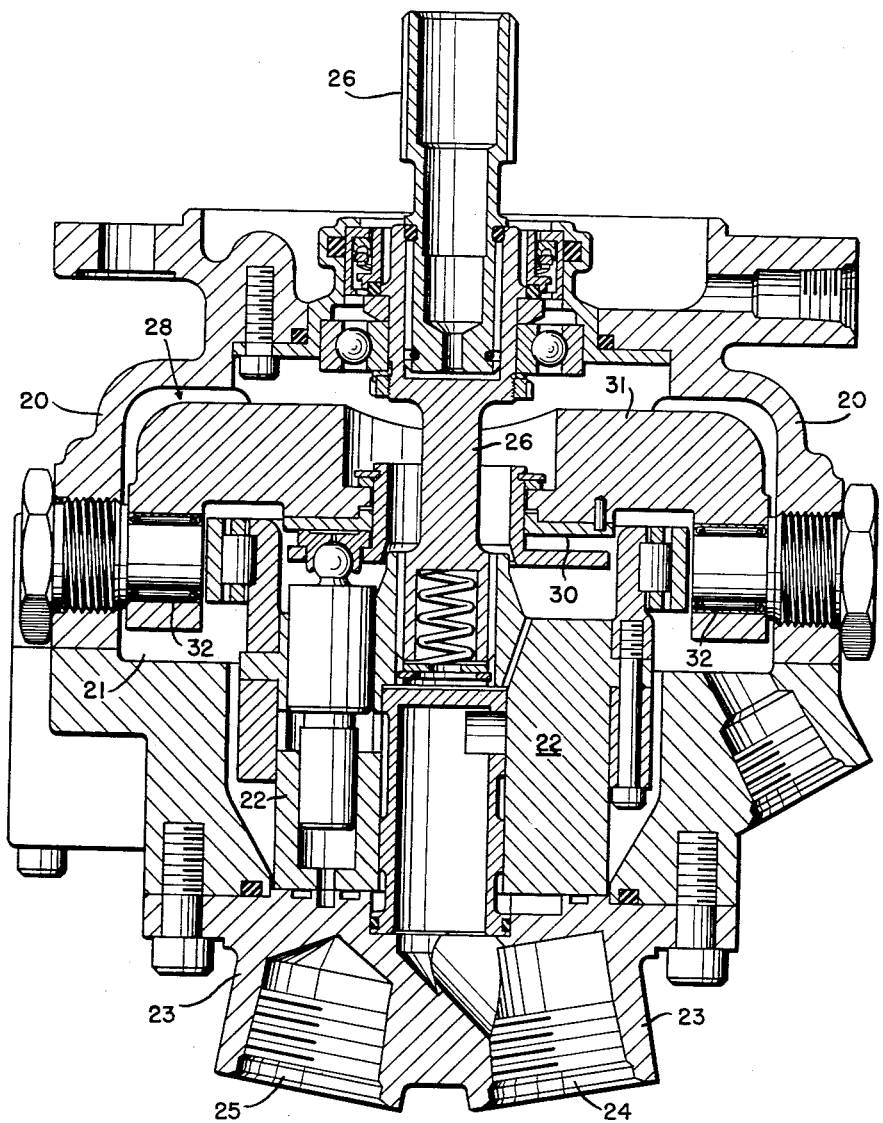
Fig. 1 is a horizontal sectional view taken through a fluid pressure energy translating device provided with a pressure compensator formed in accordance with the present invention, the plane of the section being indicated by the line I—I of Fig. 2.

Referring more particularly to the drawing, Figs. 1 and 2 are general views of a pump of the type illustrated in the copending application of Leroy Bonnette and Cecil Adams, Serial No. 234,634, filed June 30, 1951, for Axial Piston Pump. The pump forms no part of the present invention, therefore, only a general description will be given to facilitate the understanding of this invention.

The pump includes a casing 20 which forms a chamber 21 for the rotatable reception of a cylinder barrel 22. This cylinder barrel has one end in engagement with head 23 having inlet and outlet ports 24 and 25 formed therein. The cylinder barrel 22 is connected with a shaft 26 by means of which the cylinder barrel is rotated to cause a pumping action, the fluid flowing into the pump through the inlet 24 and being discharged from the outlet 25.

The pressure compensator 27, forming the subject matter of this invention, is incorporated in the casing 20 and head 23 of the pump. It is shown more particularly in Figs. 3 to 7, inclusive. The compensator is employed to control the operation of a volume changing mechanism, indicated by the numeral 28, of the pump, this mechanism including a cam plate 30 which imparts movement to the pump pistons and a pivoted hanger or yoke 31 on which the cam plate is mounted, the yoke being supported for rocking movement in bearings 32. The yoke has arms 33 and 34 projecting therefrom, these arms being provided with rollers 35. As shown in Figs. 3, 4, and 5, the yoke is normally urged in one direction by a spring pressed plunger 36 which is mounted for sliding movement in a recess 37 formed in a portion of the casing 20. When the yoke is moved by the plunger 36 to the position shown in Fig. 4, the pump will be in condition to deliver its maximum volume. The movement of the yoke by the plunger 36 causes an actuating piston 38 of the compensator to be moved to its retracted position in a cylinder 40 carried by the head 23. The piston 38 engages one of the rollers 35 while the plunger 36 engages the other roller. Piston 38 and plunger 36 are disposed on opposite sides of the pivotal axis or bearings 32 for the yoke so that movement of either of these devices will impart movement to the yoke and through the arms 33 and 34 to the other element.

As shown in Fig. 3, the plunger 36 is so constructed that the yoke may be moved a sufficient distance to cause the cam plate to be inclined in a direction which will reverse the flow of fluid through the pump. In other words, the inlet port will act as the outlet and vice versa. This construction has been employed so that excessive pressure surges may be avoided. Under normal conditions, the plunger 36 is fully extended to the position shown in Fig. 4 in which position the yoke will hold the cam plate in the full volume position. At this time, piston 38 will be fully retracted in cylinder 40, the inner end of the piston being disposed in engagement with one end of a flow control piston 41 also arranged for sliding movement in the cylinder 40. The pistons 38 and 41 have sockets formed therein to receive a compression spring 42, this spring tending to force these piston elements apart. The cylinder 40 has one or more laterally extending ports 43 formed in the side wall thereof at a position substantially registering with the end of the flow control piston engaged by the piston 38 when both pistons are in retracted positions. These ports 43 are connected by a passage 44 extending longitudinally of the cylinder 40 with the interior of the casing 20. Ports 43 establish communication between the space in the cylinder 40 between the pistons 38 and 41 and the interior of the casing 20, the interior of the casing directly communicating with the exhaust. The flow control piston 41 has a reduced orifice 45 extending therethrough, this orifice establishing limited communication between the space between the pistons 38 and 41 and the inner end of the cylinder 40. As shown in Fig. 6, this inner end of the cylinder is connected by an angular passage 46 with a bore 47 formed in the cover 23, the bore 47 being formed for the reception of a pressure responsive valve 48. This valve includes a seat insert 50 which is pressed into the bore and a cone-shaped valve element 51 yieldably urged into engagement with the seat insert by a coil spring 52. This spring has one end in engagement with an adjustable adaptor 53 threaded into the end of the bore 47. The insert 50 has a central opening or pocket 54 which is connected by one or more ports 55 extending laterally from the pocket to an external annular groove 56 formed in the insert. Angular passages 57 connect the groove 56 with the outlet port 25 of the pump.

As shown in Figs. 6 and 8, the pocket 54 receives a slidable piston 58 which is employed to assist in the opening of the valve 51 and in eliminating chatter and squeal thereof after the valve has opened. The piston 58 also acts, in cooperation with the pocket 54, as a dash pot to prevent sudden closing or dancing of valve 51 on its seat. Fig. 8 shows the construction of the piston 58 more in detail. This piston has an external annular groove 60 to receive fluid flowing into the pocket 54 through ports 55. The piston 58 has flats 61 on the sides adjacent the valve 51 to permit controlled fluid flow into engagement with the end of valve 51. The other end portion of the piston has sufficient clearance in the pocket 54 to permit limited flow of fluid under pressure to the space in the pocket at the inner end of the piston 58. The other end of this piston has a recess 62 to receive the conical end of the valve 51. Due to this engagement, the piston serves somewhat as a guide for the valve and prevents lateral movement of the valve after disengagement thereof from the seat. Due to the flow of fluid to both ends of piston 58, the forces on the ends thereof will be balanced as long as valve 51 is seated. When this valve starts to open, however, pressure at the outer end of piston 58 will start to decrease and the pressure at the other end will then tend to move the piston 58 toward valve opening position. The resistance to the escape of fluid from the inner end of pocket 54 around the piston retards the closing movement of the valve 51.

It will be seen from the foregoing that, when fluid is delivered by the pump to the outlet 25, the pressure of this fluid will be transmitted through the passages 57 to the groove 56, through the lateral orifice 55 to the pocket 54 and be applied to the end portion of the valve element 51. When this pressure increases sufficiently to overcome the force of the spring 52, the valve will start to open and fluid will flow from the pocket 54 into the bore 47. This fluid will surround the valve element 51 and be applied to opposed surfaces thereof to limit the effective area of the valve to that exposed to the pressure in the pocket 54. As pointed out above, opening movement of valve 51 permits a decrease in pressure at the outer end of the piston 58 and there is then a tendency for the piston to move outwardly and cause the valve to open still more. After valve 51 opens, the fluid pressure is also transmitted through the passage 46 to the inner end of the cylinder 40 where it is applied to the inner end of the flow control piston 41. The fluid under pressure flows through the orifice 45 formed in the piston 41 to the space between the pistons 38 and 41. From this space, the fluid under pressure may flow through the ports 43 and passage 44 to the interior of the casing and exhaust. As long as the pressure developed by the pump is insufficient to open the valve 51, the spring pressed plunger 36 will retain the volume changing yoke 31 in full volume position. When the pressure increases sufficiently, however, valve 51 will be opened to permit some of the fluid to flow into the bore 48 and into cylinder 40. A predetermined increase in pressure, if suddenly generated, will cause the flow control piston 41 and the actuating piston 38 to move outwardly in the cylinder 40 causing the volume changing yoke to move toward a zero volume position. If the pressure continues to increase, this movement of the yoke will continue until the pump ceases to deliver fluid. If this increase has been quick enough, the volume changing yoke may move beyond its center position causing the direction of flow of fluid through the pump to be reversed. This condition will exist only momentarily, however, since the spring pressed piston 36 will return the yoke toward full volume position as soon as fluid pressure is relieved in the cylinder 40.

It will be observed that, when a sudden pressure impulse is applied to the flow control piston 41, this piston will move to a position in which ports 43 are blocked. At this time the flow control will not operate. However, as soon as the pressure ceases to increase, the spring 42 will move the flow control piston 41 back toward its retracted position thereby opening the ports 43 to permit metered flow of fluid from the space between the pistons 38 and 41 to the interior of the casing. The flow control piston 41 will then be operating as a flow control, the pressure drop through the orifice 45 tending to move the piston to regulate the flow of fluid through the ports 43. If the pressure between the pistons tends to decrease too rapidly, the flow control piston will be moved to decrease the effective area of the ports 43 thus reducing the rate of pressure decrease in the space between the pistons 38 and 41. When a demand for fluid under pressure occurs in the system, the pressure in the outlet 25 will fall causing a corresponding pressure decrease in passages 57, groove 56, ports 55 and pocket 54 which will permit valve 51 to close. The pressure in bore 47, passage 46 and the inner end of cylinder 40 will then fall and piston 41 will fully retract completely opening ports 43. The space between piston 41 and plunger 38 will be in substantially unrestricted communication with exhaust and spring pressed plunger 36 will, through members 33 and 34 move plunger 38 into its fully retracted position as shown in Fig. 4. This movement occurs almost instantly when the ports 43 are fully opened.

The use of the pressure compensator above described permits the pump to deliver full volume until a predetermined pressure is approached, at which time the control starts to function to reduce the volume until only sufficient fluid is delivered to replace the leakage in the pump or that being used in the system. When this point is reached, the predetermined pressure will be developed and will be maintained until a demand for fluid is made on the system in which a pump is incorporated. When this demand is made, the control mechanism will permit the yoke to swing back toward full volume position until the pressure again approaches the predetermined value. The compensator operation will be initiated prior to the development of the predetermined pressure, the pressure at which the operation of the compensator begins being determined by the force of the spring for the plunger 36, the difference between the pressure at which the compensator operation is initiated and the predetermined desired maximum pressure of the pump being termed a pressure differential. It is an object of the invention to maintain this differential uniform so that smooth pump operation will be secured. The flow control mechanism provided in the cylinder for the actuating piston permits the differential to be maintained irrespective of the pressure settings of the pump.

An incidental advantage of the pressure compensator illustrated and described is the circulation of cooling oil through the casing. Sufficient oil flows from the outlet of the pump through passages 57, past valve 51, through passage 46 and the flow control when the compensator is operating to carry away the excess heat generated by pump operation. The piston 38 is provided with a small laterally extending port 63 which is blocked when the piston is retracted but opens shortly after movement of the piston is initiated to permit some of the fluid under pressure flowing through the reduced orifice 45 to escape to the interior of the casing. The escape of fluid in this manner tends to retard or dampen the action of the compensator and thus cause smoother operation.

While the form of embodiment of the present invention as herein disclosed constitutes a preferred form, it is to be understood that other forms might be adopted, all coming within the scope of the claims which follow.

I claim:

1. Pressure compensator control apparatus for a variable volume pump of the type having a movable volume changing member and means tending to move the same toward a full volume position comprising a body forming a piston chamber; an actuating piston disposed for movement in said chamber and operatively engaged with said volume changing member, said piston being urged toward a retracted position in said chamber by movement of said member toward full volume position; a passage in said body establishing communication between the inner end of said chamber and a pressure port of said pump; a pressure responsive valve in said fluid passage; a flow control mechanism in said piston chamber between the point of connection of said fluid passage therewith and the inner end of said actuating piston, said flow control mechanism having a piston with a reduced orifice establishing communication between the sections of the piston chamber at opposite ends of the last mentioned piston; resilient means between the pistons, said resilient means tending to urge said flow control piston toward the inner end of said piston chamber; and an exhaust passage extending from the section of the piston chamber between said pistons; movement of said flow control piston in opposition to said resilient means tending to vary the effective size of said exhaust passage.

2. Pressure compensator control apparatus for a variable volume pump of the type having a movable volume changing member and means tending to move the same toward a full volume position comprising an actuating piston and cylinder assembly, the piston being operatively engaged with said volume changing member and urged toward a retracted position by movement of said member toward full volume position; a flow control piston at the inner end of the actuating piston, said flow control piston having a restricted orifice extending therethrough, the wall of said piston cylinder having an exhaust opening formed therein to vent the space between said pistons when said flow control piston is fully retracted; resilient means between said pistons; means forming a fluid passage connecting the cylinder at the inner end of said flow control piston with a pressure port of said pump; and a pressure responsive valve in said fluid passage, said valve being movable between passage opening and passage closing positions, predetermined pressure in the pump pressure port connected with said passage being applied to said valve to move it to an open position to cause fluid flow through the passage to the inner end of said piston cylinder to move said actuating piston toward a volume reducing position.

3. Pressure compensator control apparatus for a variable volume pump of the type having a movable volume changing member and means tending to move the same toward a full volume position comprising an actuating piston and cylinder assembly, the piston being operatively engaged with said volume changing member and urged toward a retracted position by movement of said member toward full volume position; a flow control piston in said cylinder at the inner end of the actuating piston; said flow control piston having a restricted orifice extending therethrough, the wall of said cylinder having an exhaust opening formed therein to vent the space between said pistons when said flow control piston is fully retracted; spring means disposed between said pistons, said spring means tending to urge said flow control piston toward fully retracted position; means forming a fluid passage connecting the cylinder at the inner end of said flow control piston with a pressure port of said pump; valve means disposed in said fluid passage for movement between passage opening and passage closing positions, said valve being responsive to predetermined pressure in said pressure port to open to permit fluid flow to said piston cylinder; and means forming an exhaust opening in said actuating piston, said opening being disposed in position to be open at all times except when said volume changing member is approximately in full volume position.

4. Pressure compensator control apparatus for a variable volume pump of the type having a movable volume changing member and means constantly urging the same toward a full volume position comprising a body with a piston chamber; an actuating piston disposed for movement in said chamber and operatively engaged with said volume changing member, said piston being urged toward a retracted position in said chamber by movement of said member toward full volume position; means forming a fluid passage extending from the output port of said pump to the inner end of said piston chamber; valve means in said passage subject to pump output pressure on one side to open to permit fluid flow from said output port to said piston chamber to move said piston in a volume reducing direction; means forming an exhaust passage leading from said piston chamber; a second valve means in said piston chamber for controlling the flow of fluid from said piston chamber through said exhaust passage, said second valve having a piston portion exposed at one side to fluid admitted to said piston chamber; means forming a restricted passage establishing communication between the portions of said piston chamber at opposite sides of said piston portion of said second valve, fluid flow through said restricted passage causing a pressure difference at opposite sides of said piston portion which tends to move said second valve and close said exhaust passage; and yieldable means tending to move said piston portion in a direction to open said exhaust passage.

5. In pressure compensator control apparatus for a variable volume pump of the type having a movable volume changing member and means tending to move the same toward a full volume position, a body forming a piston chamber with an exhaust outlet; an actuating piston disposed for movement in said chamber and operatively engaged with said volume changing member, said piston being urged toward a retracted position in said chamber by movement of said member toward full volume position; said body forming a passage establishing communication between the inner end of said chamber and a pressure port of said pump; a first means disposed in said passage for movement between passage opening and closing positions; a second means urging said first means toward the latter position, said first means being moved in opposition to said second means by predetermined pump output pressure toward a passage opening position to apply such pressure through said passage to said piston to move said volume changing member toward zero volume position; a flow control mechanism for governing the flow of fluid from said piston chamber through said exhaust outlet, said flow control mechanism having a piston-operated valve disposed for movement relative to said exhaust outlet; means forming a restricted passage establishing communication between spaces at the opposite ends of said piston valve, fluid flow through said restricted passage creating a pressure differential at opposite ends of said piston valve which pressure differential tends to move the valve toward a position to restrict flow from said piston chamber through said exhaust outlet; and means tending to resist movement of said piston valve by said pressure differential.

6. Pressure compensator control apparatus for a variable volume pump having a movable volume changing member and means tending to move the same toward a full volume position comprising a body with a piston chamber; an actuating piston disposed for movement in said chamber and operatively engaged with said volume changing member, said piston being urged toward a retracted position in said chamber by movement of said member toward full volume position; a flow control piston between the inner end of said actuating piston and the end of said chamber; means forming a restricted passage establishing communication between the inner end of said piston chamber and the space between said pistons, the wall of said piston chamber having an exhaust opening formed therein to vent said space when said flow control piston is fully retracted; means tending to separate said pistons; means forming a fluid passage connecting the inner end of said piston chamber and a pressure port in said pump; and a valve element in said fluid passage, said valve element being normally closed, predetermined fluid pressure in said pressure port urging said valve element to passage opening position to permit fluid flow through said passage to the inner end of said piston chamber to move said actuating piston toward a volume reducing position.

7. Pressure compensator control apparatus for a variable volume pump of the type having a movable volume changing member and means constantly urging the same toward a full volume position comprising a body with a piston chamber; an actuating piston disposed for movement in said chamber and operatively engaged with said volume changing member, said piston being urged toward a retracted position in said chamber by movement of said member toward full volume position; means forming a fluid passage establishing communication between a pressure port in said pump and the inner end of said piston chamber; valve means in said passage subject to pump output pressure on one side to open to permit fluid flow from said pressure port to said piston chamber to move said piston in a volume reducing direction; means forming an exhaust passage leading from said piston chamber; a second valve means in said exhaust passage, said second valve means being movable between exhaust passage opening and closing positions, fluid flow through said exhaust passage tending to create a pressure drop on opposed portions of said valve, said valve means being responsive to the pressure drop to move toward an exhaust passage closing position; and resilient means tending to urge said second valve means toward an exhaust passage opening position.

References Cited in the file of this patent
UNITED STATES PATENTS

| | | |
|---|---|---|
| 2,299,235 | Snader et al. | Oct. 20, 1942 |
| 2,407,013 | Ifield | Sept. 3, 1946 |
| 2,474,033 | Chamberlin et al. | June 21, 1949 |